United States Patent
Alberkrack et al.

(10) Patent No.: US 7,705,550 B2
(45) Date of Patent: Apr. 27, 2010

(54) NOISE SUPPRESSION FOR HALL SENSOR ARRANGEMENTS

(76) Inventors: Jade H. Alberkrack, 1834 E. Calle De Caballos, Tempe, AZ (US) 85284; Robert Alan Brannen, 900 N. Rural Rd., Apt. 1018, Chandler, AZ (US) 85226; Thomas Peter Bushey, 10440 E. Dennis St., Mesa, AZ (US) 86207

( * ) Notice: Subject to any disclaimer, the term of this patent is extended or adjusted under 35 U.S.C. 154(b) by 0 days.

(21) Appl. No.: 12/471,834

(22) Filed: May 26, 2009

(65) Prior Publication Data

US 2009/0230904 A1  Sep. 17, 2009

Related U.S. Application Data

(63) Continuation of application No. 11/799,331, filed on May 1, 2007, now Pat. No. 7,538,505.

(51) Int. Cl.
*H02P 6/16* (2006.01)

(52) U.S. Cl. .............. 318/400.04; 318/400.01; 318/400.14; 318/400.38; 318/599

(58) Field of Classification Search ........... 318/400.04, 318/400.01, 400.13, 400.14, 400.38, 254.1, 318/599, 700

See application file for complete search history.

(56) References Cited

U.S. PATENT DOCUMENTS

| 7,064,510 | B2 * | 6/2006 | Brannen et al. ......... 318/400.3 |
| 7,259,531 | B1 | 8/2007 | Liu |
| 7,262,570 | B2 | 8/2007 | Alberkrack et al. |
| 7,276,867 | B2 | 10/2007 | Alberkrack et al. |
| 7,417,390 | B2 * | 8/2008 | Getz et al. ............. 318/400.01 |
| 7,443,119 | B2 | 10/2008 | Liu |
| 7,518,330 | B2 * | 4/2009 | Lin et al. .................... 318/599 |
| 7,590,334 | B2 * | 9/2009 | Yabusaki et al. ............ 388/811 |
| 2002/0060544 | A1 * | 5/2002 | Teutsch et al. .............. 318/599 |
| 2006/0238154 | A1 | 10/2006 | Brannen et al. |
| 2008/0252239 | A1 | 10/2008 | Lin et al. |

* cited by examiner

*Primary Examiner*—Bentsu Ro
*Assistant Examiner*—Thai Dinh
(74) *Attorney, Agent, or Firm*—Knobbe Martens Olson & Bear LLP

(57) ABSTRACT

A method and apparatus is provided for processing signals from a Hall-effect device arrangement coupled to a monolithic brushless DC motor where the motor is driven by a PWM circuit providing PWM drive signals.

20 Claims, 5 Drawing Sheets

US 7,705,550 B2

NOISE SUPPRESSION FOR HALL SENSOR ARRANGEMENTS

RELATED APPLICATIONS

This application is a continuation of U.S. application Ser. No. 11/799,331, filed May 1, 2007, which is incorporated by reference herein in its entirety.

FIELD OF THE INVENTION

The invention pertains to motor drive and control circuits, in general, and to direct current motor circuits utilizing Pulse Width Modulation (PWM) motor drive and that utilize Hall-effect device sensors arrangements, in particular.

BACKGROUND OF THE INVENTION

Monolithic brushless DC motors are increasingly utilized as fan motors in various computer applications. Pulse width modulation drive circuits are commonly used in conjunction with control circuits to control the speed of such fan motors.

In some applications, Hall-effect type sensors and amplifiers are utilized to generate signals to determine the rotational position and speed of the motor.

One problem that occurs when utilizing Hall-effect type sensors in conjunction with PWM driven motors is that the leading and trailing edges of each pulse of the PWM signals induces a noise spike in the Hall sensor outputs.

SUMMARY OF THE INVENTION

In accordance with the principles of the invention, an improved arrangement is provided that suppresses PWM caused noise in the signal produced by Hall-effect device sensor arrangements.

Further in accordance with the principles of the invention, a method of processing signals from a Hall-effect device arrangement coupled to a monolithic brushless DC motor where the motor is driven by a PWM circuit providing PWM drive signals is provided. The method comprises the steps of: receiving signals from the Hall-effect device arrangement; providing output signals levels at an output node that correspond to output signal levels from the Hall-effect device arrangement; providing first PWM signals that precede the PWM drive signals by a first predetermined time period; detecting edges of the first PWM signals; and holding the signal level at the output node at its existing level for a predetermined time duration upon detection of each edge of the first PWM signals.

Still further in accordance with the principles of the invention, the predetermined time duration is selected to correspond to the sum of the predetermined time period and the time period during which transient noise appears on the Hall-effect device arrangement output signals.

Yet further in accordance with the invention, a motor circuit is provided for use with a monolithic brushless DC motor having a Hall-effect device arrangement coupled to the monolithic brushless DC motor. The Hall-effect device arrangement provides signals indicative of the rotational position and speed of the motor. The motor circuit comprises a sampling circuit having one or more input nodes coupled to the Hall-effect device arrangement, a sample control input node, and an output node. The motor circuit includes a motor drive PWM circuit that has a first output node and second output nodes coupleable to the motor. The PWM circuit provides a first PWM signal at the first output nodes and second PWM signals at the second output nodes. The first PWM signal precedes the second PWM signals by a predetermined first time period. The motor circuit includes an edge detector circuit having an input node coupleable to the PWM circuit first output node to receive the first PWM signal. The edge detector circuit has an output node, and the edge detector provides an edge indicating signal at the output node whenever the first PWM signal transitions between two states. A pulse generating circuit has an input node coupled to the edge detector circuit output node. The pulse generating circuit has an output node and is responsive to each edge indicating signal to provide a pulse signal at the output node. The pulse signal has a predetermined time duration selected to be greater than the predetermined first time period and the time period of noise spikes generated by the second PWM signals. The output node of the pulse generating circuit is coupled to the sampling circuit sample control input node. The sampling circuit provides an output signal at the output node having a level that follows the signal level at the sampling circuit input node. The sampling circuit holds the signal level at the output node during the time duration that the pulse signal is present at the sample control input node.

Still further in accordance with the invention, a single substrate is provided comprising the sampling circuit, the edge detector circuit, and the pulse generating circuit formed thereon.

Even further in accordance with the invention, the single substrate further comprises the motor drive PWM circuit formed thereon.

BRIEF DESCRIPTION OF THE DRAWINGS

The invention will be better understood from a reading of the following detailed description of a preferred embodiment of the invention in conjunction with the drawing figures in which like reference designations are utilized to designate like elements, and in which.

DETAILED DESCRIPTION

Figure 1:
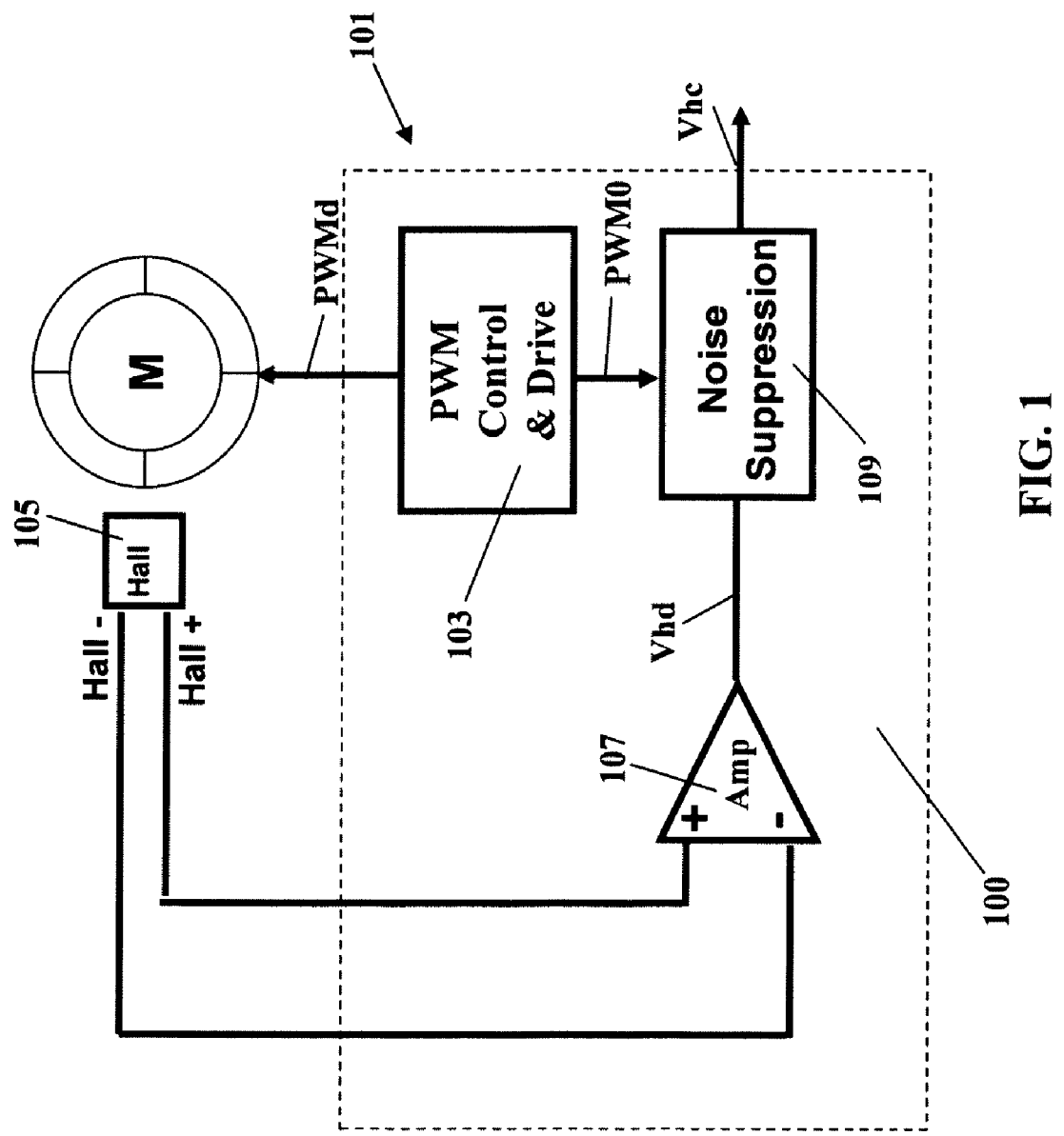
FIG. 1 illustrates a system in accordance with the invention.

Turning now to FIG. 1, a direct current brushless motor M is driven by integrated motor control and drive circuit 101. Circuit 101 in the illustrative embodiment, is formed on a single chip or substrate 100. Circuit 101 is an integrated circuit motor controller of the type utilized to control fans or other types of motors in applications in which power management is of concern. Circuit 101 includes circuitry to provide all required functions for implementing fan speed control. Circuit 101 includes a PWM motor control and drive circuit 103 that includes a fixed frequency oscillator, a comparator and a latch for speed control, commutation logic for proper drive sequencing, and on-chip power MOSFETs for direct motor drive.

Associated with motor M is a Hall-effect sensor 105 that provides an output signal, the output frequency of which is directly dependent on and which correlates to the rotational speed of motor M. The output leads Hall+ and Hall– of sensor 105 are connected to a Hall sensor amplifier 107. Hall-effect sensor 105 and Hall sensor amplifier 107 are collectively and separately referred to herein as a 'Hall arrangement'.

Figure 2:
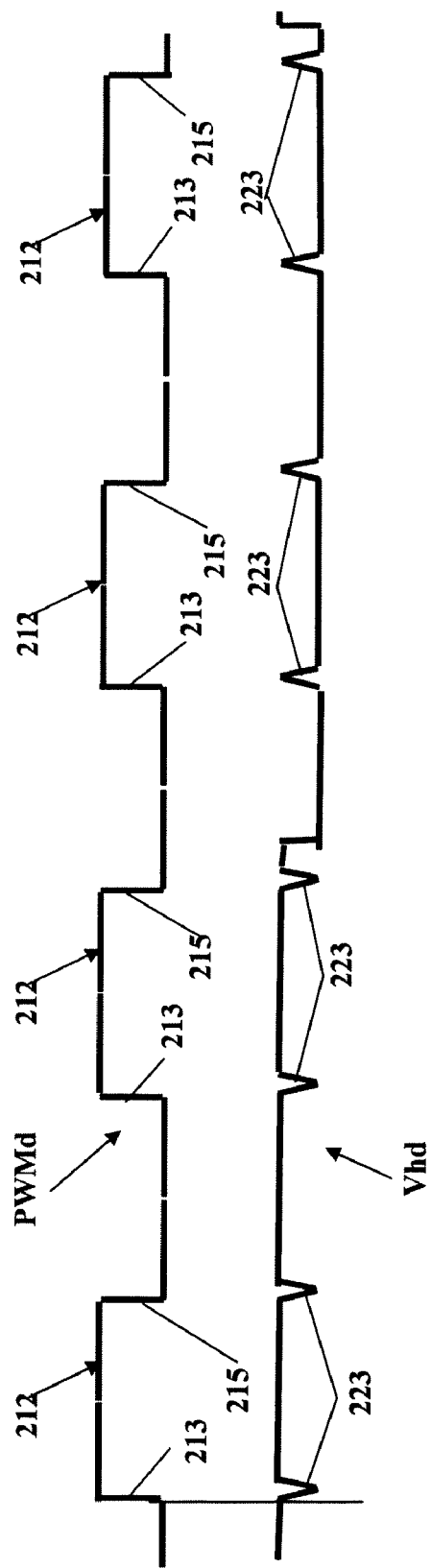
FIG. 2 illustrates selected voltage waveforms produced in the system of FIG. 1.

Turning now to FIG. 2, waveform PWMd is the waveform of the PWM signal from PWM control and drive circuit 103 that drives motor M. Waveform Vhd is the waveform at the output of Hall amplifier 107. Waveform PWMd produces noise in motor M that is picked up on the output of Hall sensor 105 and appears at the output of Hall amplifier 107. The noise is caused by the edge transitions 213, 215 of the PWM waveform PWMd. The resulting noise appears at the output of Hall amplifier 107 as noise spikes 223 in the waveform Vhd.

Turning back to FIG. 1, a noise suppression circuit 109 is provided in accordance with the principles of the invention to provide an output signal Vhc which tracks the Hall arrangement output signal without PWM induced noise. Noise suppression circuit 109 is included on the same integrated circuit 100 that includes PWM control and drive circuit 103 and hall amplifier 107. As will be appreciated by those skilled in the art, noise suppression circuit 109 may be provided as a separate integrated circuit or may be included on an integrated circuit that includes other circuitry.

Figure 3:
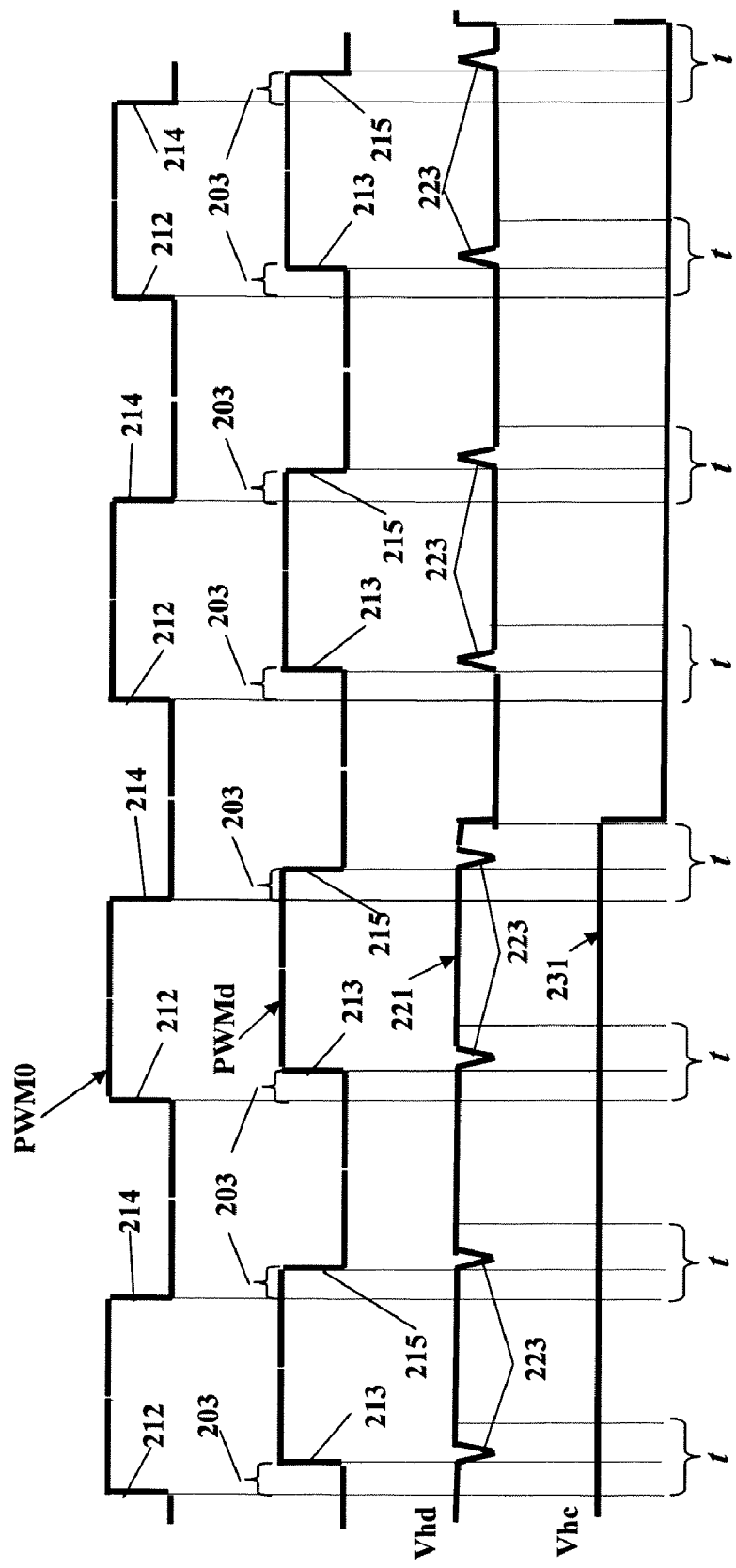
FIG. 3 illustrates voltage waveforms of FIG. 2 and additional waveforms produced in the system of FIG. 1.

FIG. 3 illustrates how the apparatus and method of the present invention provides an output signal that has PWM induced noise spikes eliminated from an output signal that correlates to the output of the Hall sensor arrangement comprised of Hall sensor 105 and Hall amplifier 107. A signal PWMO is provided by circuit 103. Signal PWMO precedes signal PWMd by a predetermined first time period 203.

Figure 4:
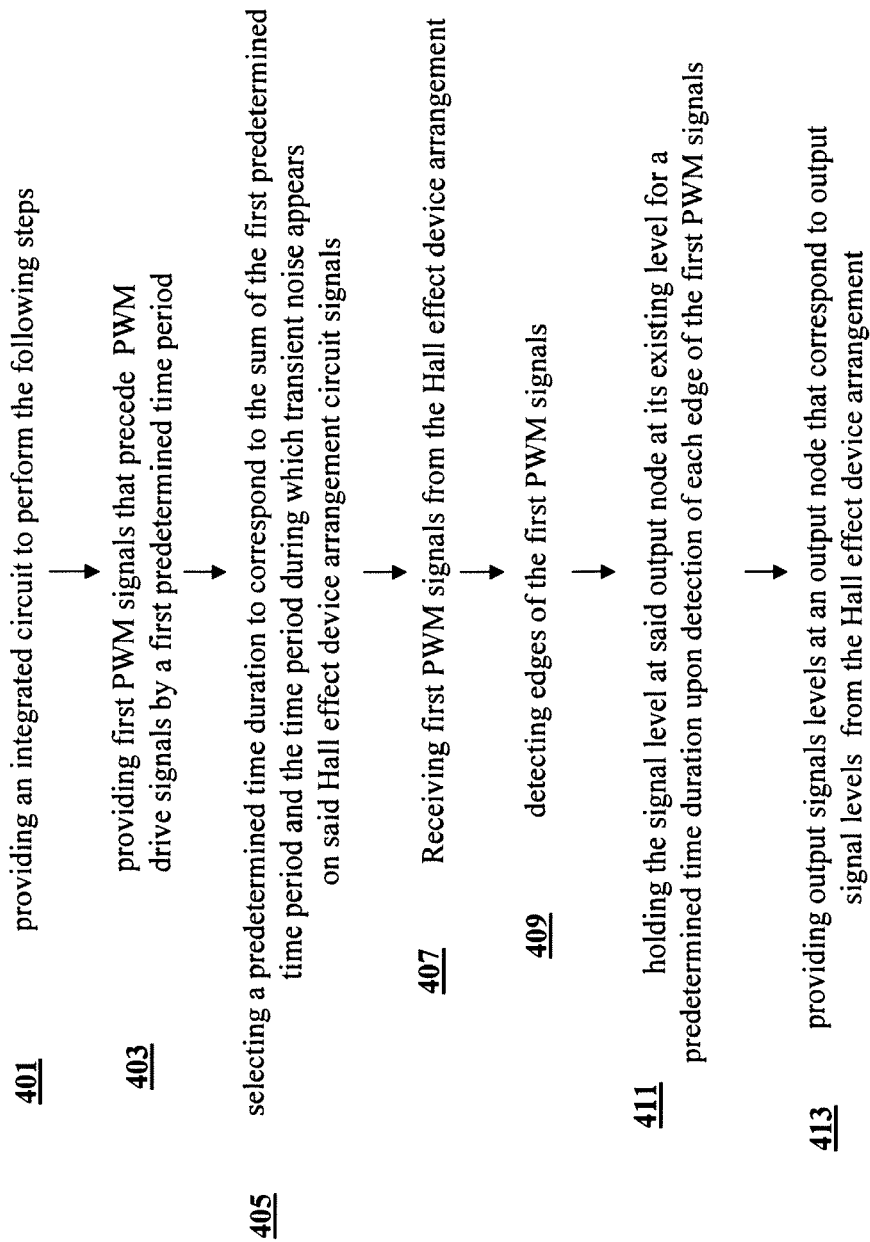
FIG. 4 illustrates the method of the invention.

Turning to FIG. 4, the method by which the apparatus of the illustrative embodiment eliminates the PWM induced noise is illustrated. At step 401, an integrated circuit is provided to perform the following steps: providing first PWM signals that precede PWM drive signals by a first predetermined time period at step 403; selecting a predetermined time duration to correspond to the sum of the first predetermined time period and the time period during which transient noise appears on the Hall-effect device arrangement circuit signals at step 405; receiving first PWM signals from the Hall-effect device arrangement at step 407; detecting edges of the first PWM signals at step 409; holding the signal level at the output node at its existing level for a predetermined time duration upon detection of each edge of the first PWM signals at step 411; and providing output signals levels at an output node that correspond to output signal levels from the Hall-effect device arrangement at step 413.

Figure 5:
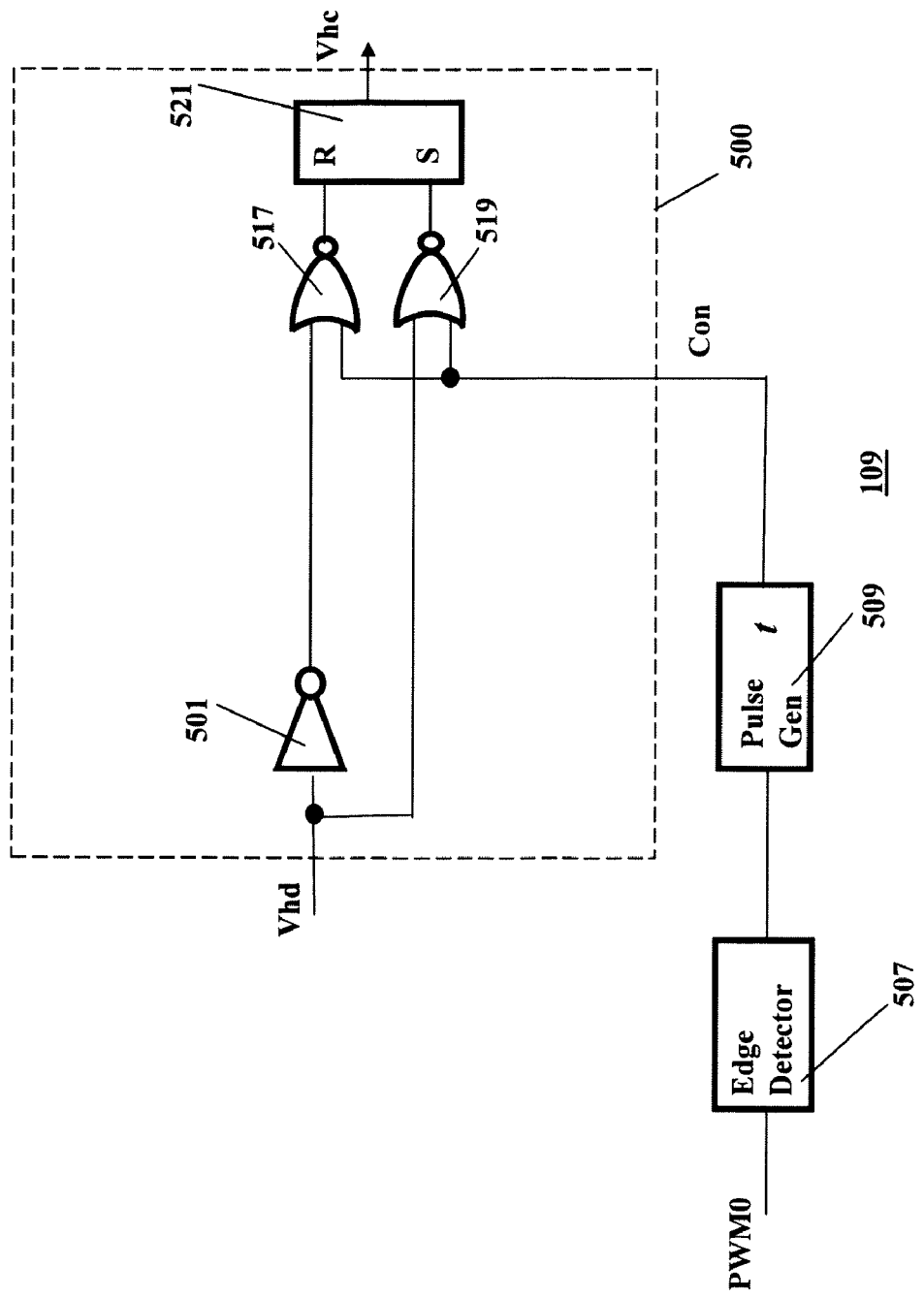
FIG. 5 is a diagram illustrating the noise suppression block of FIG. 1 in greater detail.

The methodology of FIG. 4 is carried out by the noise suppression circuit 109 of the illustrative embodiment shown in FIG. 5.

Noise suppression circuit 109, as noted above is formed on an integrated circuit 100 as illustrated in FIG. 1. Noise suppression circuit 109 receives as inputs the Hall arrangement output signal Vhd and the signal PWMO from circuit 103. Noise suppression circuit 109 provides as an output a clean output signal Vhc.

An edge detector circuit 507 receives signal PWMO and provides an output on each edge 212, 214 of the pulses of PWMO. The output of edge detector 507 is coupled to a pulse generator 509. The output of pulse generator 509 provides a pulse output that represents a time period "t" that is sufficiently long so as to extend beyond the time period during which noise spikes 223 occur on the Hall arrangement output signal Vhd.

Latch circuit 521 receives the hall sensor output signal Vhd and its logic complement and combines those signals with the time delay signal from pulse generator 509 which is coupled to gates 517, 519 to control latch 521.

A motor circuit 100 is provided for use with a monolithic brushless DC motor M having a Hall-effect device arrangement 105 coupled to the monolithic brushless DC motor. The Hall-effect device arrangement 105 provides signals indicative of the rotational position and speed of the motor. Motor circuit 100 includes a motor drive PWM circuit 103, that is coupleable to motor M. PWM circuit 103 provides a first PWM signal PWMO and second PWM signals PWMd. First PWM signals PWMO precede the second PWM signals PWMd by a predetermined first time period 203. Motor circuit 100 includes an edge detector circuit 507 having an input node coupleable to the PWM circuit to receive the first PWM signal PWMO. Edge detector circuit 507 has an output node, and the edge detector provides an edge indicating signal at the output node whenever the first PWM signal PWMO transitions between two states. A pulse generating circuit or time delay circuit 509 has an input node coupled to the edge detector circuit 507 output node. Time delay or pulse generating circuit 509 has an output node and is responsive to each edge indicating signal to provide a pulse signal at the output node. The pulse signal has a predetermined time duration t selected to be greater than the predetermined first time period 203 and the time period of noise spikes generated by the second PWM signals. Inverter 501, gates 517, 519 and latch 521 form a sampling circuit 500. The output node of time delay or pulse generator circuit 509 is coupled to the sampling circuit 500 sample control input node Con. Sampling circuit 500 provides an output signal Vhc at the output node having a level that follows the level of the signal Vhd at the sampling circuit input node. Sampling circuit 500 holds the signal level Vhc at the output node during the time duration that the pulse signal is present at the sample control input node Con.

The invention has been described in conjunction with illustrative embodiments. It will be appreciated by those skilled in the art that various changes may be made to the embodiments shown and described without departing from the spirit or scope of the invention.

It is not intended that the invention be limited in any manner to the specific embodiments shown and described. It is intended that the invention only be limited by the claims appended hereto.

What is claimed is:

1. A device comprising:
    a pulse-width modulation (PWM) motor drive circuit having a first output node and a second output node, wherein the second output node is configured to couple to a motor, wherein the PWM motor drive circuit is configured to provide a first PWM signal at the first output node and provide a second PWM signal at the second output node, and wherein the first PWM signal precedes the second PWM signal by a predetermined time period; and
    a noise suppression circuit having a first input node, a second input node, and an output node, wherein the first input node is coupled to the first output node of the PWM motor drive circuit, wherein the noise suppression circuit is configured to receive the first PWM signal from the PWM motor drive circuit and to receive, at the second input node, output signals from a Hall-effect device that is coupled to the motor, wherein the output signals from the Hall-effect device indicate a rotational position and speed of the motor and have one or more transient noise spikes, wherein the noise suppression circuit is further configured to detect edges of the first PWM signal and to provide an output signal at the output node that corresponds to output signals from the Hall-effect device, and wherein the noise suppression circuit output signal is configured to be provided at an existing level for a predetermined time duration in response to detecting each edge of the first PWM signal.

2. The device of claim 1, further comprising a single substrate, wherein the PWM motor drive circuit and the noise suppression circuit are both formed thereon.

3. The device of claim 1, further comprising an amplifier coupled to an output of the Hall-effect device and coupled to the noise suppression circuit second input node, wherein the amplifier is configured to receive signals from the Hall-effect device and to output an amplified signal to the noise suppression circuit.

4. The device of claim 1, wherein the noise suppression circuit further comprises:
   an edge detector having an output node and configured to receive the first PWM signal and to output an edge indicating signal at the output node whenever the first PWM signal transitions between two states;
   a pulse generator having an output node and an input node coupled to the edge detector output node, wherein the pulse generator is configured to receive the edge indicating signal and to generate an output pulse at the pulse generator output node in response to said receiving the edge indicating signal; and
   a latch having first and second input nodes and an output node, wherein the first input node is configured to receive the signals from the Hall-effect device, wherein the second input node is connected to the pulse generator output node, and wherein the latch is configured to latch the signals from the Hall-effect device and to provide a latched signal for the duration of the output pulse at the latch output node.

5. The device of claim 4, wherein the latch further comprises an inverter configured to precondition signals from the Hall-effect device.

6. The device of claim 5, wherein the latch further comprises one or more gates configured to precondition the output signals from the Hall-effect device and the output pulse from the pulse generator.

7. The device of claim 1, wherein the PWM motor drive circuit and the noise suppression circuit comprise a single integrated circuit.

8. The device of claim 1, wherein the predetermined time duration is equal to or greater than the predetermined time period between the first and second PWM signals.

9. The device of claim 1, wherein the predetermined time duration is equal to or greater than the predetermined time period between the start of the first and second PWM signals summed with a duration of one or more transient noise spikes in the output signals from the Hall-effect device.

10. An integrated circuit for processing signals from a Hall-effect device circuit coupled to a monolithic brushless DC motor being driven by pulse-width modulation (PWM) drive signals, the integrated circuit comprising:
    means for receiving output signals from the Hall-effect device circuit;
    means for providing processed output signal levels at an output node that correspond to levels of the output signals from the Hall-effect device circuit;
    means for providing first PWM signals that precede the PWM drive signals by a first predetermined time period;
    means for detecting edges of the first PWM signals; and
    means for holding the processed signal level at the output node at its existing level for a predetermined time duration in response to detecting each edge of the first PWM signals.

11. The circuit of claim 10, wherein the means for receiving output signals comprises an amplifier coupled to the output of the Hall-effect device circuit and coupled to the means for providing processed output signal levels.

12. The circuit of claim 10, wherein the means for providing processed output signal levels comprises a sampling circuit.

13. The circuit of claim 10, wherein the means for providing first PWM signals comprises a PWM control and drive circuit.

14. The circuit of claim 10, wherein the means for detecting edges of the first PWM signals comprises an edge detector.

15. The circuit of claim 10, wherein the means for holding the processed signal level at the output node comprises a latch.

16. A method for suppressing noise in signals provided from a Hall-effect device coupled to a monolithic brushless DC motor being driven by pulse-width modulation (PWM) drive signals, the method comprising
    providing a PWM drive signal at a first node, wherein the first node is configured to couple to a motor;
    providing a PWM control signal at a second node, wherein the PWM control signal precedes the PWM drive signal by a predetermined period;
    receiving, at a third node, output signals from a Hall-effect device coupled to the motor, wherein the outputs from the Hall-effect device indicate the rotational position and speed of the motor and have one or more transient noise spikes; and
    receiving the PWM control signal at the second node;
    detecting a transition in the PWM control signal between two states; and
    outputting, at a fourth node, a held value corresponding to the output signals from the Hall-effect device for a predetermined duration in response to the detected transition.

17. The method of claim 16, further comprising conditioning the output signals from the Hall-effect device prior to said outputting a held value.

18. The method of claim 16, wherein the predetermined time duration is equal to or greater than the predetermined time period between the PWM drive signal and the PWM control signal.

19. The method of claim 16, wherein the predetermined time duration is equal to or greater than the predetermined time period between the PWM drive signal and the PWM control signal summed with a duration of one or more transient noise spikes in the output signals from the Hall-effect device.

20. The method of claim 16, wherein the predetermined time duration is equal to or greater than the predetermined time period between the first and second PWM signals.

* * * * *